UNITED STATES PATENT OFFICE.

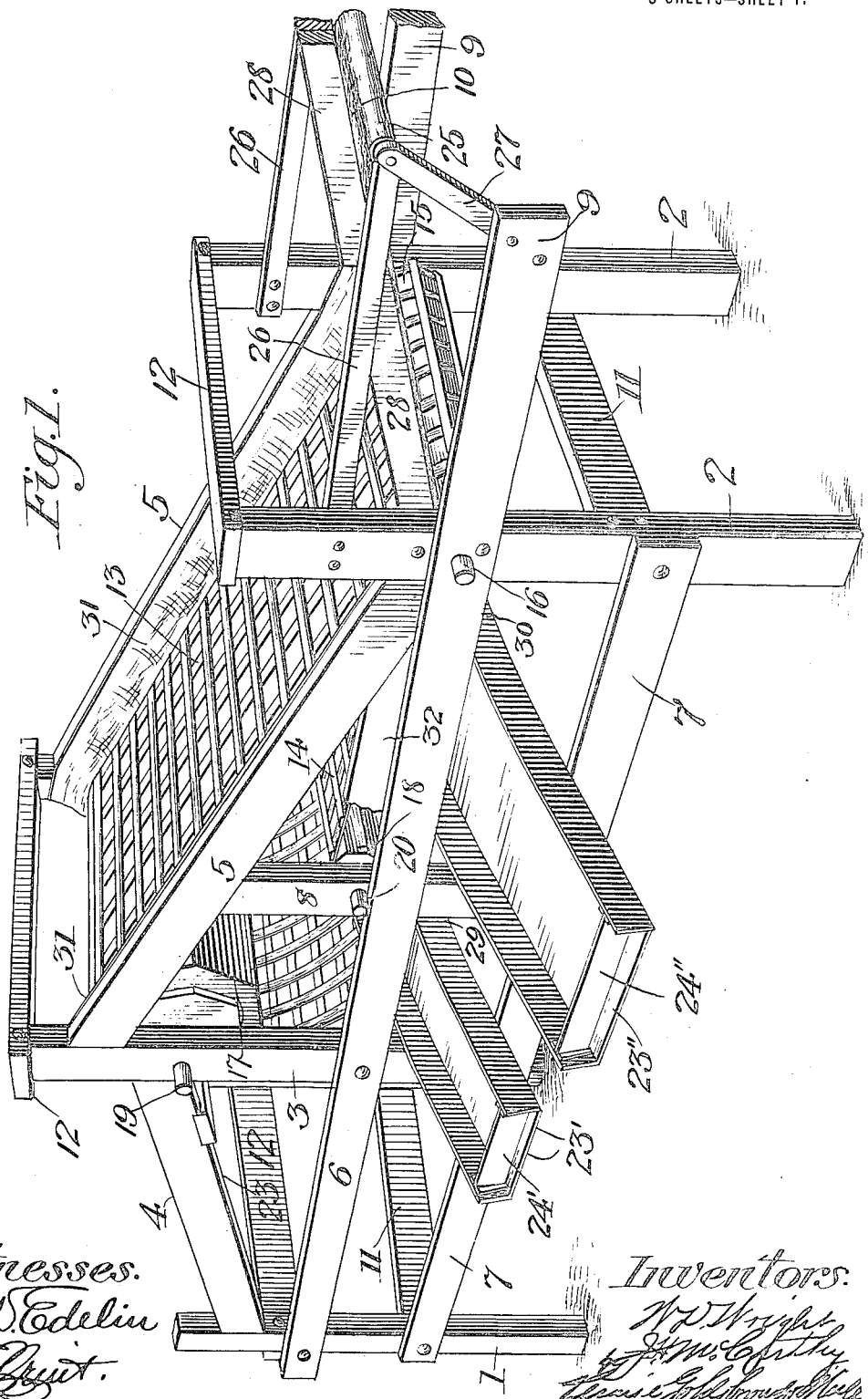

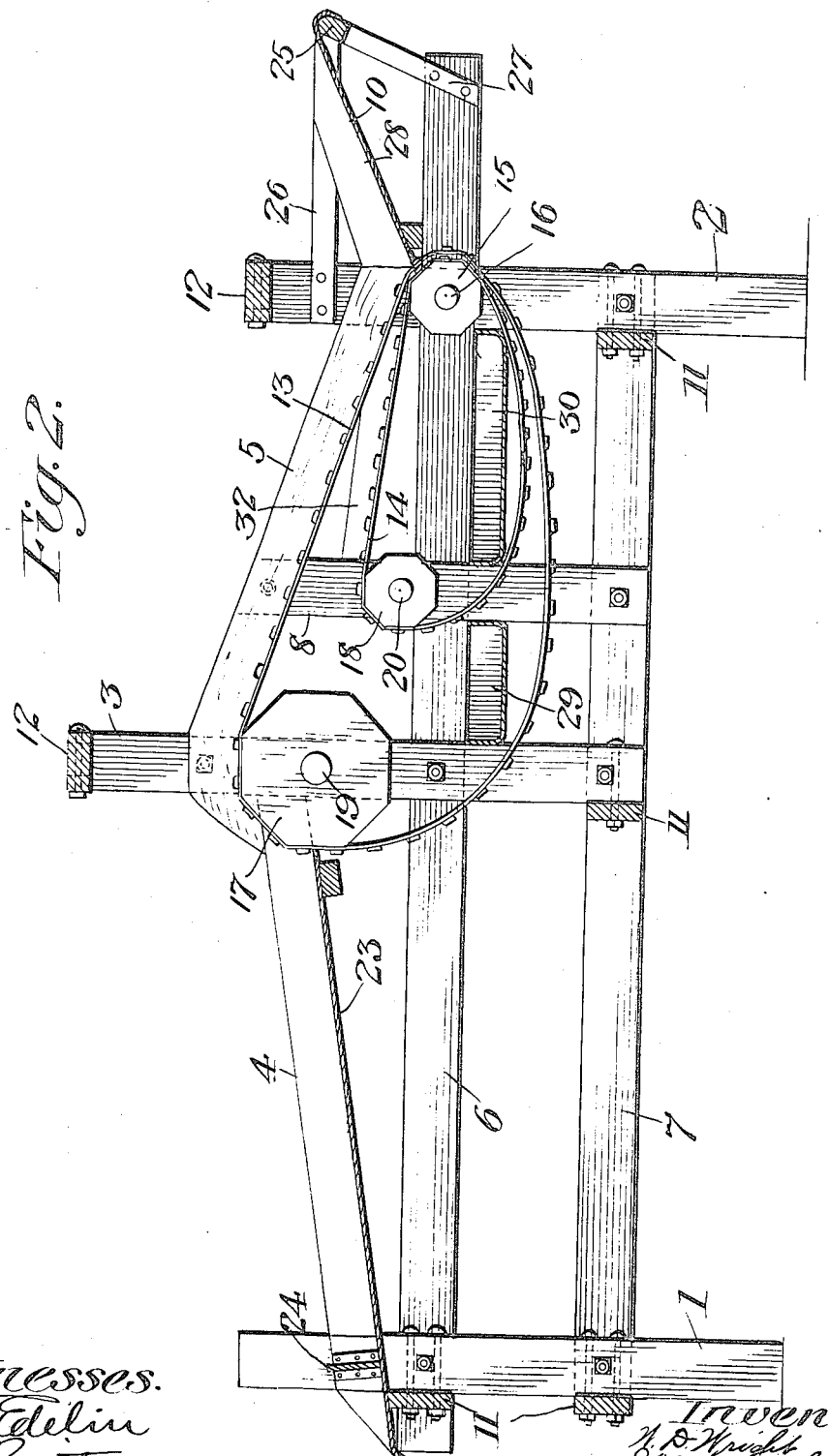

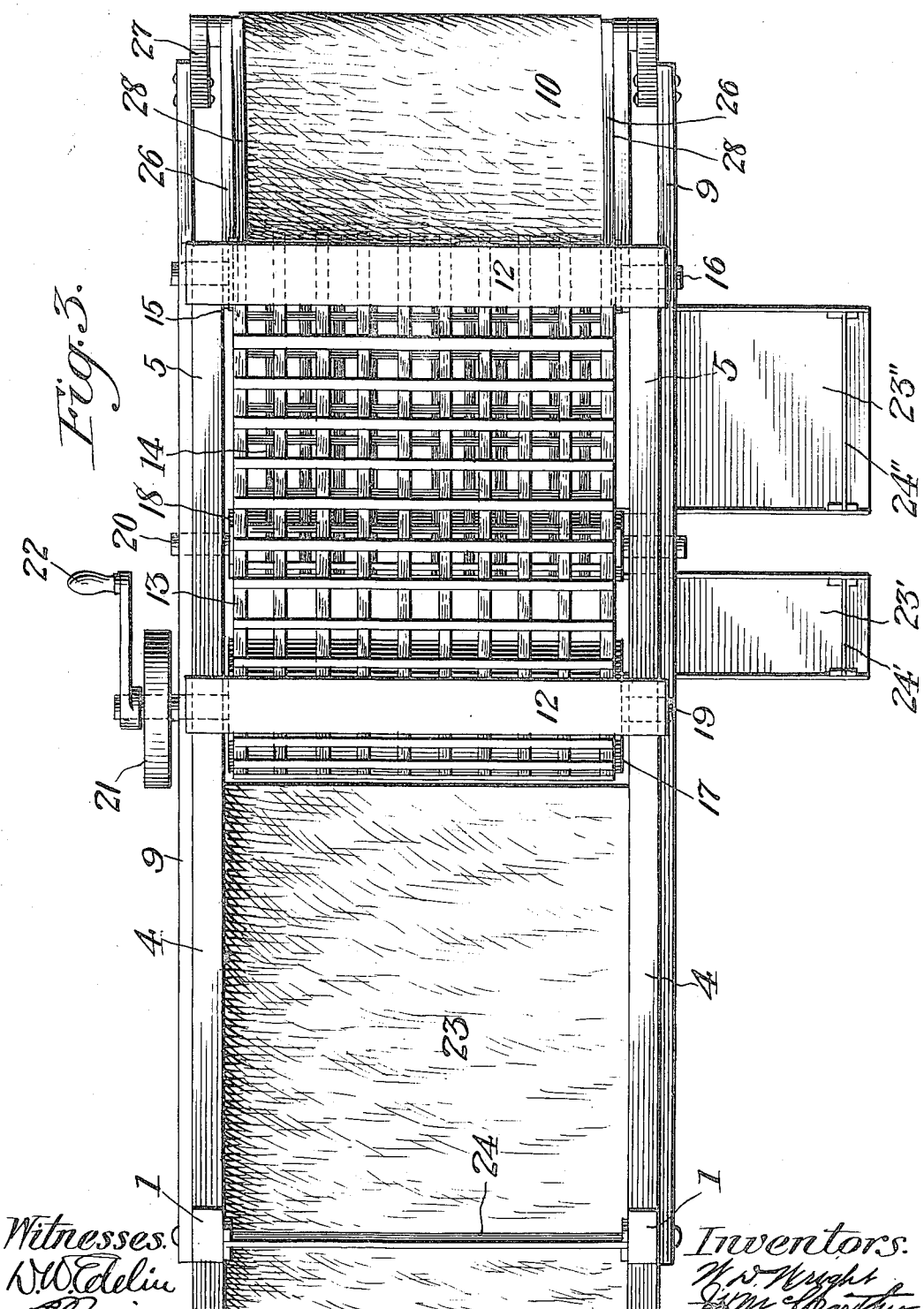

WILLIAM DONALD WRIGHT AND JOHN H. McCARTHY, OF ALBION, NEW YORK.

FRUIT AND VEGETABLE GRADER.

1,159,460.   Specification of Letters Patent.   Patented Nov. 9, 1915.

Application filed November 16, 1914. Serial No. 872,464.

*To all whom it may concern:*

Be it known that we, WILLIAM DONALD WRIGHT and JOHN H. McCARTHY, citizens of the United States, both residing in the city of Albion, county of Orleans, and State of New York, have invented certain new and useful Improvements in Fruit and Vegetable Graders; and we do hereby declare the following to be a full, clear, and exact description of the invention, such as will enable others skilled in the art to which it appertains to make and use the same.

This invention relates to a fruit and vegetable separator or grader having combined therewith, assorting tables for separating the good fruit or vegetables from the bad, either before or after the same have been first graded as to size, and has particular reference to a hand or power-driven apparatus of simple construction adapted to separate the fruit or vegetables into three different sizes and deliver the same from said apparatus at predetermined points.

Briefly considered, the apparatus comprises a supporting frame carrying at one end, a receiving chute, at which point the fruit or the like is delivered to the machine, two endless separating and conveyer belts of different sizes, the smaller being arranged within the larger and adapted to receive the fruit that falls through the meshes of the larger belt, a delivery or sorting table for the fruit of the first grade passing over the larger belt, and separate delivery chutes and sorting tables for the fruit that passes over and through the smaller belt.

Another feature of the invention is the means of operating the inner or smaller belt by having the outer or larger belt pass around one of the rolls carrying the smaller belt and on top of and in frictional engagement with said inner belt. The other ends of the belts pass around separate and independent rolls, the independent roll of the larger belt having applied thereto, the power for operating the apparatus.

The object of the invention is to provide an apparatus of the above mentioned character, which will be simple in operation and construction, and, being of knockdown character, easily transported to and assembled at the place of operation.

A further object to be noted is that by combining assorting tables with the separator, or grader, fruit as it is gathered can be placed directly into the grader without having to be previously assorted, the assorting operation taking place as the fruit is being delivered from the grader, as will be hereinafter more fully described.

Another feature of the invention is that by having an assorting table in combination with, or as a part of, the grading mechanism, the fruit, if desired, can be first placed upon the sorting table and assorted before running it through the separating mechanism for grading, said sorting tables being capable of use either separate from, or in combination with, the grading mechanism.

Referring to the drawings, in which like numerals designate like parts throughout the several views, Figure 1 is a perspective view of the complete apparatus; Fig. 2 is a longitudinal cross-section; and Fig. 3 is a plan view thereof.

In the accompanying drawings, the main support or frame-work of the apparatus comprises two similar or corresponding side-frame sections consisting of end posts 1 and 2, a central post 3, inclined rails 4 and 5, and parallel longitudinal stringers 6 and 7. The inclined side rails 4 and 5 are secured at one end to the end or corner posts 1 and 2, near the top thereof, and the other or inner ends of said rails are attached to opposite sides, and at the upper end of the central post 3. This central post 3 is fastened at its lower end to the longitudinal stringers 6 and 7, and extends up above the tops of the end posts 1 and 2, thus giving the proper inclination to the rails 4 and 5, as clearly shown in Fig. 1. Intermediate the central post 3 and the corner posts or legs 1 and 2, is a vertical member 8 which is attached to the stringers 6 and 7 and inclined rail 5, the purpose of which will be hereinafter more fully set forth. The longitudinal stringer 6 has an extension 9, which is adapted to support the receiving chute 10, upon which the fruit or the like, to be separated or graded, is deposited.

It is to be remembered that the above description refers to both sides of the apparatus, as they are exactly alike in every detail and a description of one will be sufficient for both.

Connecting the two above described side-frames, are cross-braces 11 and 12, the braces 12 binding the assembled frame-work together at the top, and the braces 11 holding the same together at the bottom, making a very rigid, as well as simple, construction. The fastenings used in building the side-frames of the apparatus are preferably bolts, as shown, although any convenient form of fastening, such as screws or nails, may be employed. It is, however, essential that the cross-braces 11 and 12 be secured by bolts or other readily detachable fastenings, so that the apparatus may be easily taken apart for the purpose of easy transportation and handling, and being so constructed, can be readily assembled again at the place of operation. If bolts are used in constructing the side frames, the whole machine may be taken apart, although it is only necessary to have the cross-braces 11 and 12 removable to make a very convenient arrangement for transporting purposes.

Supported within the above-described frame-work or support, is a separating or grading apparatus, comprising two endless conveyer belts or screens 13 and 14 of different size and mesh, the screening belt 14, which is the smaller, being arranged within the larger belt 13. These belts 13 and 14 turn about a common non-circular roll or cylinder 15, mounted upon a shaft 16 journaled in the end posts 2, the other ends of the belts 13 and 14 being supported on non-circular or angular rolls 17 and 18, respectively. The roll 17 is carried by a shaft 19 journaled in the middle uprights 3, and the roll 18, supporting the inner end of the smaller belt 14, has a bearing for its shaft 20 in the intermediate member 8. To one end of the shaft 19 is keyed a belt or band pulley 21 and a hand-crank 22 for operating said roll either manually or by power. By turning the roll 17 through either the crank 22 or pulley 21, the belt 13 will be put in motion, and with it, the belt 14, by virtue of the arrangement of the belts on the roll 15. Upon referring to Fig. 2, it will be noted that belt 13 passes around roll 15 on top of and in frictional engagement with belt 14, which is also supported on said roll, so that any movement of belt 13 will also affect belt 14 and set it in motion. This is a very simple and novel means of operating these belts and does away with the necessity of additional gears or other driving mechanism, which would tend to complicate the assembling or construction, as well as the operation, of the machine.

Another novel feature of the invention is the arrangement of the assorting tables 23, 23′ and 23″, in connection with the grading or separating mechanism just described. The table 23 in its preferred form, is constructed by securing between the inclined rails 4, a strip of flexible material, such as canvas and the like, said table being of such length that the fruit or vegetables, passing through the grading machine over belt 13, will not become so congested therein, as to interfere with the continuous operation of the grading mechanism during the assorting operation. The sorting tables 23′ and 23″ will be hereinafter more fully referred to. To retain the fruit upon the table while being assorted, there is provided an end gate 24, which may be lifted out and inserted at will during the sorting operation. At the opposite end of the machine there is an inclined chute 10 for receiving the fruit as it is placed into the machine, which chute is also made of canvas, and is supported at its outer end by a cross-bar 25, having its ends secured to strips 26 and 27, which strips are in turn fastened to the end posts 2 and extensions 9 of the longitudinal stringers 5. To retain the fruit upon the chute 10, there are provided side or guard rails 28, to the bottom edges of which the side edges of the canvas chute are secured.

Arranged transversely of the machine, at the inner end of belt 14 and in a plane just below the same, is a receiving chute 29, which is adapted to catch and deliver upon the adjoining sorting table 23′, all fruit or vegetables passing through belt 13 and too large to pass through belt 14, and which are carried over the end thereof. The small or inferior fruit and the like, together with dirt and other trash, falls through the belt and is caught and conveyed upon the sorting table 23″ by a transversely arranged chute 30, which is positioned within belt 14 and directly beneath the upper surface thereof. These chutes and sorting table may be made of canvas, or of wood, as shown, or they may be constructed with wooden sides and canvas bottom, similar to chute 10, if desired, but, in any event, they must be so constructed as to be readily attached or detached from the machine in accord with the knockdown character of the apparatus as a whole. The sorting tables 23′ and 23″, in their preferred form, are continuations of the chutes 29 and 30, but they may be made separate and attached thereto, their construction, however, being similar to that of the chutes 29 and 30. These sorting tables are also provided, if necessary, with end gates 24′ and 24″, the same as the sorting table 23.

To prevent the fruit, while being graded and while traveling over the belt 13, from becoming clogged or lodged between the edges of the belt and the inclined rails 5, there is secured along the inner edges of said rails, canvas strips 31, which strips also overlap the screening belt 13, as clearly shown in Fig. 1. For similar reasons, there is provided a guard rail 32, for the screening belt 14.

From the foregoing description, the operation of the apparatus is obvious. Assuming that the assorting operation takes place after grading, the fruit or the like, as it is gathered, is deposited upon the inclined chute 10, where it rolls down and is picked up by the moving screen or belt 13, which is operated either manually by the crank 22 or through the pulley 21 connected up to any convenient source of power. The fruit in its course, is carried along with the belt 13, which belt is shaken or vibrated by reason of the same passing over the non-circular rolls 15 and 17. As the fruit is jarred or shaken up, the smaller fruit will fall through said belt and drop onto belt 14, which has also been set in motion, as hereinbefore described. The larger fruit is carried the full length of the belt 13 and is dropped over onto the sorting table 23, where it is assorted, and the bad or defective fruit removed, the good and perfect fruit passing over the end of the table and collected in receptacles provided for the purpose. By reason of the angular shape of rolls 15 and 18, the screening belt 14 is also caused to vibrate and agitate the fruit thereon, the smallest or third grade, together with dirt and the like, falling through the meshes of the moving screen 14 into the chute 30, from which it is delivered to the sorting table 23'', where the bad fruit and dirt can be readily removed from this grade. The fruit and the like too large to pass through said second screen is carried over the same into chute 29, from which chute, it is delivered for assorting upon the table 23', and afterward collected as second grade fruit, the whole operation being continuous as long, of course, as the fruit is delivered into the machine.

If it is desired to assort the fruit before separating or grading, it is first placed upon the sorting table 10, assorted, and then run through the machine for grading, it being unnecessary to provide separate and independent apparatus for assorting the fruit and grading the same, as this machine is capable of doing both, either separate from, or in combination with each other.

What we claim is:—

1. In a machine for grading fruit and the like, comprising a frame, having journaled therein three non-circular or angular shaped rolls, two endless separating or screening belts of different size supported by said rolls, the outer or larger belt passing around the smaller belt and around one of the rolls carrying the smaller or inner belt, on top of and in frictional engagement therewith, and the other ends of the belts passing around separate and independent angular-shaped rolls, the independent roll of the larger belt having applied thereto the power for operating the apparatus and thereby vibrating the screening belts.

2. In a machine for grading fruit and the like, comprising a supporting frame, a receiving chute at one end, two endless separating or screening belts of different size and mesh arranged one within the other, one end of each of said belts passing over a common roll and the other ends thereof passing around separate and independent rolls, the independent roll of the larger belt having applied thereto the power for operating both belts through their frictional engagement with each other on the common roll, and separate detachable sorting or delivery tables for the graded fruit passing over the first or larger belt and over and through the second or smaller belt.

In testimony whereof we affix our signatures, in presence of two witnesses.

WILLIAM DONALD WRIGHT.
JOHN H. McCARTHY.

Witnesses:
  LENA J. CLARK,
  FREDERIC M. THOMPSON.